March 10, 1953  B. C. HEINZ, SR  2,631,003
MIXING VALVE
Filed June 21, 1951

Bruno C. Heinz, Sr.
INVENTOR.

BY
*Attorneys*

Patented Mar. 10, 1953

2,631,003

UNITED STATES PATENT OFFICE 2,631,003

MIXING VALVE

Bruno C. Heinz, Sr., Falls Village, Conn.

Application June 21, 1951, Serial No. 232,764

5 Claims. (Cl. 251—106)

The present invention relates to improvements in valves and more particularly to a mixing valve which is adapted to be employed with bathroom fixtures whereby hot and cold water can be selectively dispensed through the shower or into the tub and wherein preselected ratios of mixed hot and cold water can be selectively sent to either the tub or shower.

An object of the present invention is to provide an improved mixing valve wherein the valve member and valve casing have passages, bores and chambers formed therein whereby the hot and cold inlet water can be either selectively or proportionately received from the inlet pipes into the valve chamber for mixing in passage to either the tub or shower outlet.

Another object of the present invention resides in the novel construction of the valve member wherein the bores formed therein are positioned on one side of and tangential to a plane extending through a diameter of the valve member, whereby the pair of bores in the valve member can be alternately communicated with the passages in the casing or proportionately communicated with the inlet passages of the valve casing for supplying hot and cold and mixed hot and cold water to the outlet passages.

Still another object of the present invention resides in the critical positioning of the bores in the valve member whereby the slightest movement from the full cold water position will start the introduction of hot water for mixing with the cold water and vice versa.

Various other objects and advantages will become apparent from the detailed description to follow. The best form in which I have contemplated applying my invention is clearly illustrated in the accompanying drawings, wherein.

Figure 1:
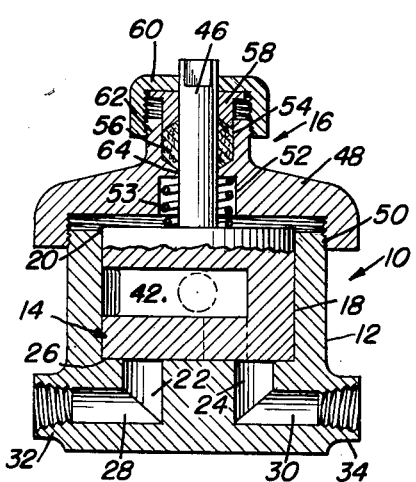
Figure 1 is a vertical sectional view through the mixing valve of the present invention.

Referring more particularly to the drawings, wherein like numerals designate like parts throughout, the numeral 10 designates generally the mixing valve of the present invention which is comprised of a valve casing 12, valve means 14, and cover means 16.

The valve casing 12 is formed with a cylindrical recess 18 open at its upper end 20. The valve casing is formed with a pair of longitudinal passages 22 and 24 which are in communication with the bottom 26 of the recess and communication with a pair of radially extending passages 28 and 30. The casing 12 has a pair of internally threaded bosses 32 and 34 for connection to the hot and cold water inlet pipes respectively.

Figure 4:
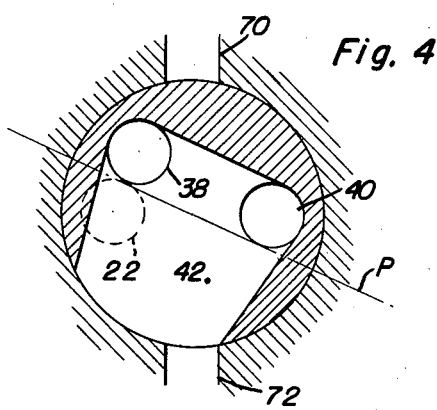
Figure 4 is a diagrammatic view showing the valve member communicating with the cold water inlet passage, the chamber of the valve member being out of communication with the hot water inlet passage; and, Figure 5 is a diagrammatic view similar to Figure 4 but wherein the valve member has been rotated from full cold water position to full hot water position.

The valve means 14 is comprised of a cylindrical valve member 36 having a pair of longitudinal bores 38 and 40 formed therein and opening at the bottom 42 of the valve member. As seen best in Figures 4 and 5, the bores 38 and 40 lie on one side of and tangential to a plane P which extends through a diameter of the valve member.

The valve member 36 is also formed with a valve chamber 42 which interconnects the inner ends of the bores 38 and 40 communicates with the exterior of the valve member 36 through the opening 44 in the periphery thereof.

The valve member 36 has a valve stem 46 integrally formed therewith and axially extending therefrom.

The cover means 16 includes the closure 48 which is threadably engaged on the upper end of the valve casing 12 at 50 and has a recess 52 axially formed therein. Coaxial with the recess 52 is a second recess 54 in which stuffing 56 can be disposed. The bushing 58 is slidably received within the recess 54 and compresses the stuffing 56 upon downward threading of the bonnet element 60 on the closure 48 at 62. The closure 48 has an opening 64, the valve stem 46 extending through the recesses 52 and 54 and the opening 64.

Figure 2:
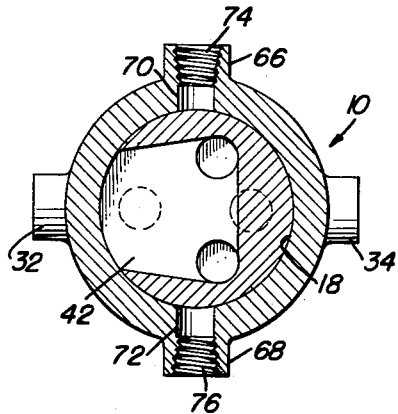
Figure 2 is a horizontal sectional view through the mixing valve of Figure 1.
Figure 3:
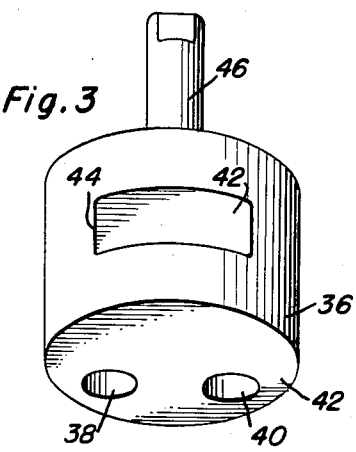
Figure 3 is a detailed perspective view of the valve member and valve stem showing the bores and chamber formed therein.

Looking now at Figure 2 it will be seen that the valve casing 12 is formed with a pair of diametrically opposed bosses 66 and 68 which are bored to form outlets 70 and 72 and have internal threading at 74 and 76. The outlet 70 is adapted to be in communication with the shower when the inlet pipe of a shower is threadably connected to the boss 66. Similarly, the outlet 72 is adapted to be in communication with the tub when the tub inlet pipe is threadably engaged within the boss 68.

Figure 5:
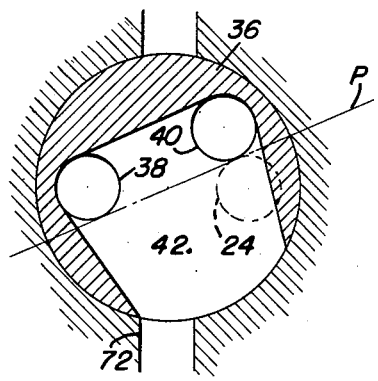

In view of the foregoing description of the structure it is believed that one skilled in the art will readily understand the manner in which the mixing valve operates. When the valve member 36 is in the position shown in Figure 4, the bore 40 is in open communication with the cold water inlet 24 while the bore 38 is out of communication with the passage 22, the chamber 42 providing communication with the outlet 72 to the tub. If desired, the valve member can be rotated so that the cold water inlet can be connected to the outlet 70 to the shower. Figure 5 shows the bore 38 in open communication with the passage 22 and the bore 40 out of communication with the passage 24, the chamber 42 providing communication with the outlet 72 to the tub.

In view of the critical positioning of the bores 38 and 40, it will be seen that the minutest rotation of the valve member 36 will effect limited communication between the bore 40 and the passage 24 (see Figure 5) whereby mixed hot and cold water in predetermined proportion can be provided for dispensing to the tub or shower, depending upon the positioning of the valve member 36.

Spring means 53 is disposed in the recess 52 for downwardly urging the valve member 36 in the recess 18.

In view of the foregoing description, taken in conjunction with the drawings, it is believed that a device has been provided which will accomplish all of the objects hereinabove set forth.

Having described the invention, what is claimed as new is:

1. A mixing valve comprising a generally cylindrical valve casing having a cylindrical recess therein, said valve casing having a pair of longitudinal passages in communication with the bottom of the recess and a pair of radially extending passages in communication with the longitudinal passages, said radial passages providing inlets for hot and cold water, said casing having a pair of outlets for connection to the shower and tub inlet pipes, valve means disposed in said valve body recess rotatable to selectively effect communication between the cold water inlet and the shower and tub inlet pipes, between the hot water inlet and the shower and tub inlet pipes and between the hot and cold water inlets and the shower and tub inlet pipes, said valve means including a cylindrical valve member having a pair of longitudinal bores formed therein and opening at the bottom of the valve member for selective alignment with the longitudinal passages in said valve casing, said longitudinal bores disposed on one side of and tangential to a plane extending through a diameter of the valve member, and said valve member having a valve chamber communicating with the inner ends of said longitudinal bores, said chamber having an opening in the periphery of said member for selective communication with the shower and tub inlet pipes.

2. A mixing valve comprising a generally cylindrical valve casing having a cylindrical recess therein, said valve casing having a pair of longitudinal passages in communication with the bottom of the recess and a pair of radially extending passages in communication with the longitudinal passages, said radial passages providing inlets for hot and cold water, said casing having a pair of outlets for connection to the shower and tub inlet pipes, valve means disposed in said valve body recess rotatable to selectively effect communication between the cold water inlet and the shower and tub inlet pipes, between the hot water inlet and the shower and tub inlet pipes and between the hot and cold water inlets and the shower and tub inlet pipes, said valve means including a cylindrical valve member having a pair of longitudinal bores formed therein and opening at the bottom of the valve member for selective alignment with the longitudinal passages in said valve casing, said longitudinal bores disposed on one side of and tangential to a plane extending through a diameter of the valve member, and said valve member having a valve chamber communicating with the inner ends of said longitudinal bores, said chamber having an opening in the periphery of said member for selective communication with the shower and tub inlet pipes, said valve casing having a closure covering the upper end of the casing recess, a valve stem rotatably extending through said closure, and spring means disposed in engagement with said cover downwardly urging said member.

3. A mixing valve comprising a generally cylindrical valve casing having a cylindrical recess therein, said valve casing having a pair of diametrically opposed inlet passages extending through a bottom wall thereof, a pair of outlet passages extending through the wall of said casing, a cylindrical valve member mounted in said cylindrical recess for rotation with respect to said valve casing, a transversely extending valve chamber in said valve member having an opening in the periphery of said valve member selectively alignable with one of said outlet passages, longitudinal bores in said valve member extending downwardly therethrough, said longitudinal bores being selectively alignable with said inlet passages.

4. A mixing valve comprising a generally cylindrical valve casing having a cylindrical recess therein, said valve casing having a pair of diametrically opposed inlet passages extending through a bottom wall thereof, a pair of outlet passages extending through the wall of said casing, a cylindrical valve member mounted within said cylindrical recess for rotation with respect to said valve casing, a transversely extending valve chamber in said valve member having an opening in the periphery of said valve member selectively alignable with one of said outlet passages, longitudinal bores in said valve member extending downwardly therethrough, said longitudinal bores being selectively alignable with said inlet passages, said longitudinal bores being disposed on one side of and tangential to a plane extending through a diameter of said valve member, the centers of said inlet passages and said longitudinal bores being equally spaced from a longitudinal axis passing through the center of said valve member.

5. A cylindrical valve member having a valve stem extending from one end thereof, said valve member having a transversely extending valve chamber opening through the periphery of said valve member, a pair of longitudinal bores opening through the other end of said valve member and communicating with said valve chamber, said longitudinal bores being disposed on one side of and tangential to a plane extending through a diameter of said valve member.

BRUNO C. HEINZ, Sr.

REFERENCES CITED

The following references are of record in the file of this patent:

UNITED STATES PATENTS

| Number | Name | Date |
| --- | --- | --- |
| 141,102 | Bate | July 22, 1873 |
| 1,843,390 | Foster | Feb. 2, 1932 |
| 1,886,889 | Krupp | Nov. 8, 1932 |